United States Patent [19]
Demick

[11] Patent Number: 5,492,257
[45] Date of Patent: Feb. 20, 1996

[54] BACK PANEL ORGANIZER FOR VAN-TYPE MOTOR VEHICLES

[75] Inventor: Robert L. Demick, Eastpointe, Mich.

[73] Assignee: Hoover Universal, Inc., Plymouth, Mich.

[21] Appl. No.: 310,550

[22] Filed: Sep. 22, 1994

[51] Int. Cl.⁶ ..................................................... B60R 7/00
[52] U.S. Cl. ....................... 224/275; 224/925; 296/37.16; 297/188.04; 248/95
[58] Field of Search .................................... 224/275, 552, 224/556, 925, 402, 403, 404, 405; 296/37.1, 37.8, 37.16; 248/95; 211/12, 195; 297/188.04, 188.05, 188.11

[56] References Cited

U.S. PATENT DOCUMENTS

| | | | |
|---|---|---|---|
| 1,329,988 | 2/1920 | Montgomery | 155/123 |
| 1,781,977 | 11/1930 | Cummings | 155/123 |
| 1,798,930 | 3/1931 | Davis | 296/37 |
| 2,337,480 | 12/1943 | Logan | 155/132 |
| 3,094,354 | 6/1963 | Bernier | 297/112 |
| 5,161,700 | 11/1992 | Stannis et al. | 224/925 |
| 5,415,457 | 5/1995 | Kifer | 224/275 |

FOREIGN PATENT DOCUMENTS 2025192  12/1971  Germany ............................. 224/275

Primary Examiner—Henry J. Recla
Assistant Examiner—Timothy L. Maust
Attorney, Agent, or Firm—Harness, Dickey & Pierce

[57] ABSTRACT

A back panel organizer for van-type motor vehicles having a storage space rearward of the rearmost seat of the vehicle includes a panel adapted to be mounted on the back of the rear seat in place of the seat back panel, a tubular frame pivotally mounted on the back panel for movement between a stored position in which it is received in a recessed portion of the panel and a use position in which the frame extends horizontally into the storage space with the front end of the cantilever mounted frame being supported by a support structure, the frame and panel including handle hooks adapted to have the handles of a plastic shopping bag wrapped therearound, for supporting the shopping bag in an upright position and limiting horizontal movement of the shopping bag within the storage space as the vehicle is driven.

20 Claims, 3 Drawing Sheets

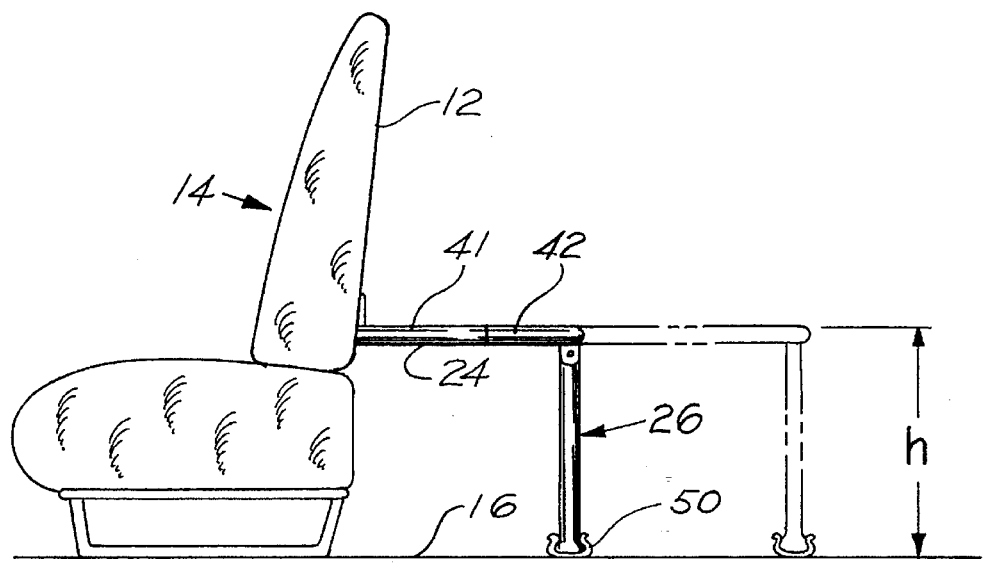
FIG. 4
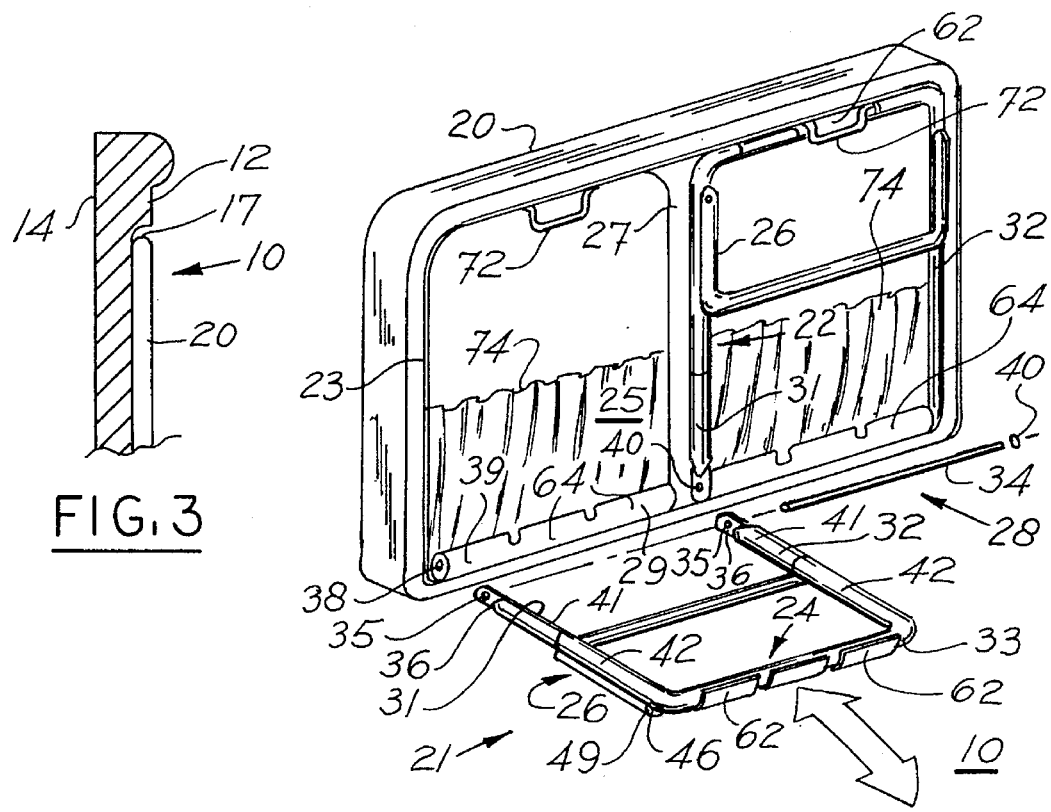
FIG. 3
FIG. 5

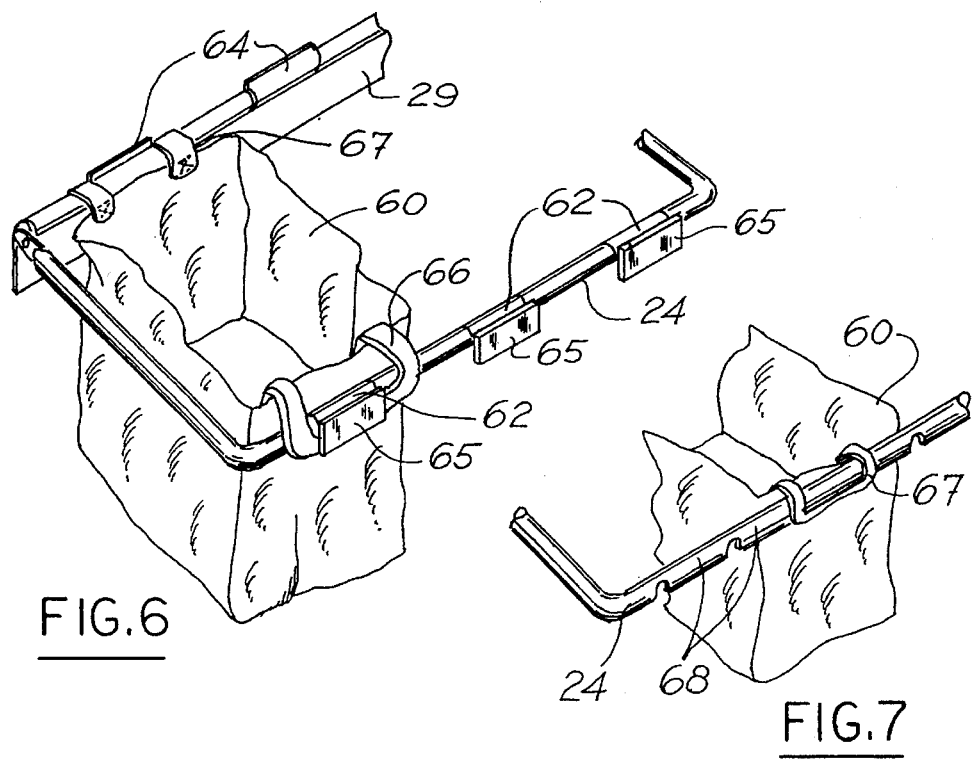
FIG.6
FIG.7
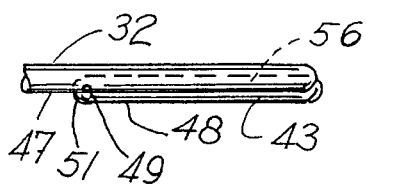
FIG.8
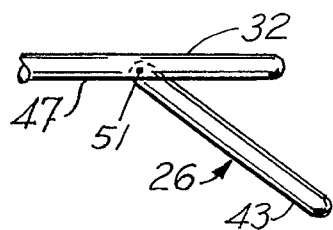
FIG.9
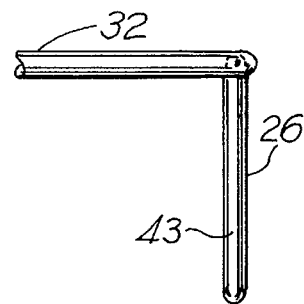
FIG.10
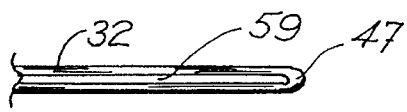
FIG.11
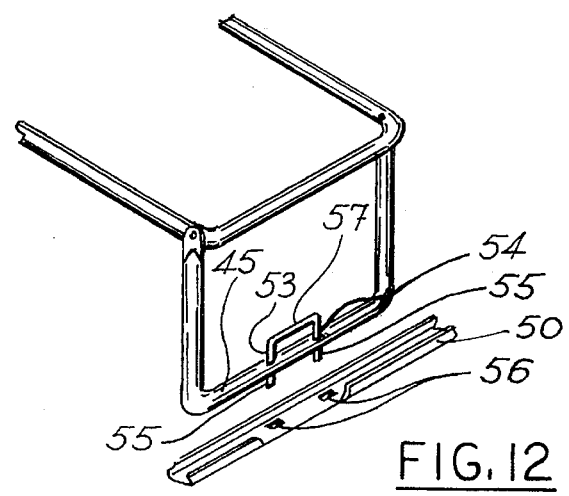
FIG.12

BACK PANEL ORGANIZER FOR VAN-TYPE MOTOR VEHICLES

BACKGROUND OF THE INVENTION

This invention relates to a apparatus that is adapted to be mounted on seat back of the rearmost seat of a motor vehicle for organizing storage space behind the rearmost seat of the vehicle.

It has become common for merchandisers to package purchased merchandise in plastic shopping bags, and particularly, n plastic bags of the type that are not self-supporting. Shopping bags of this type are convenient because they conform to the shape of the items contained in the bags and the bags are formed with cutout areas defining handles that make it easier to carry home the purchases. However, such bags are difficult to store in a vehicle because they are not self-supporting. When such bags are set down, they collapse around the items contained in the bags, exposing the contents of the bags and permitting the items to fall out and roll around in the storage space of the vehicle when the vehicle is driven home after a shopping trip. Moreover, other bags, such as the large paper sacks used by grocery stores, and self-supporting shopping bags, which are made of paper, are likely to tip over, allowing their contents to spill out when the vehicle accelerates, stops suddenly or turns a corner.

SUMMARY OF THE INVENTION

The present invention provides a back panel organizer for motor vehicles. The back panel organizer is particularly suitable for van-type motor vehicles, but can be used in other type of motor vehicles, such as pick-up trucks and passenger cars, for example. The back panel organizer includes a support rack mounted on a panel that is adapted to be contained in the back panel of the rear-most seat of van-type vehicles and to be folded down into the storage space at the rear of the vehicle to provide support for shopping bags, full size grocery bags, packages, boxes and the like. The shopping bags can be self-supporting bags made of paper, or plastic bags which are not self-supporting, such as those commonly used by retail outlets, particularly grocery stores. The support rack includes handle holders and the handles of the bags being transported are wrapped around a pair of the handle holders so that the support rack supports the bags in an upright condition with their open ends directed upwardly to prevent the contents of the bags from spilling out of the bags as the vehicle is driven.

More specifically, the support rack includes a frame having parallel side arms which extend from a base portion of the frame. The frame is mounted to the panel by a pivot assembly which permits the frame to pivot about the ends of its side arms relative to the panel between a stored position in which the frame is oriented generally vertically and is located within a recessed area of the panel and a use position in which the frame is oriented generally horizontally in cantilever form and extends into the storage space. The side arms of the frame are adapted to telescope into one another to allow the support rack to be stored substantially flush with the back of the rear seat and to provide for fore-and-aft depth adjustment of the frame. A retaining means maintains the frame in the stored position. The support rack further includes a support structure that is articulated to the frame and is adapted to folded down to rest on the floor of the vehicle storage space for supporting the front end of the frame above the floor of the vehicle at the proper height for maintaining the shopping bags in an upright position.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

FIG. 3 is a fragmentary side view, in section, of the vehicle seat and the back panel organizer of FIG. 2, illustrating the manner in which the panel is received into the seat back;

FIG. 4 is a side view of the vehicle seat illustrating the fore-and-aft adjustment of the frame;

FIG. 5 is a perspective view of the back panel organizer, partially exploded to illustrate the pivot mechanism which mounts the support rack to the panel;

FIG. 6 is a fragmentary view of the support rack, illustrating the manner in which a shopping bag is supported therein by a pair of handle holders;

FIG. 7 is a view similar to FIG. 5, but illustrating an alternative embodiment for the handle holders;

FIGS. 8–11 illustrate an alternative embodiment for the support structure of the support rack; and FIG. 12 illustrates an embodiment for the support structure of the support rack and including a locking mechanism for locking the support structure to the track.

DESCRIPTION OF PREFERRED EMBODIMENTS

Figure 1:
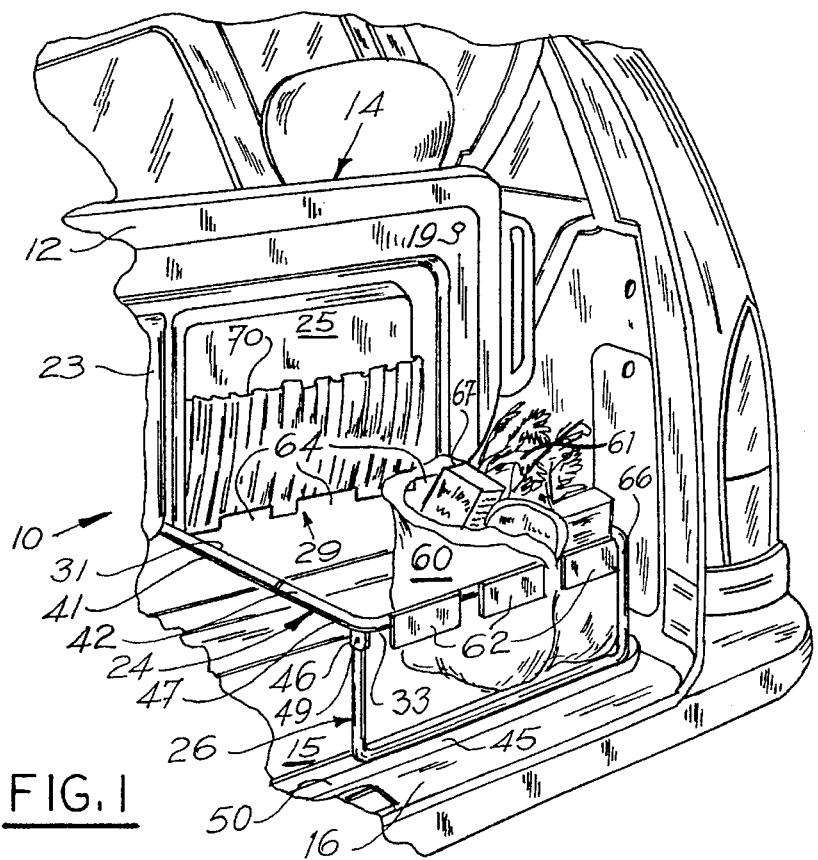
FIG. 1 is a fragmentary, perspective view of the rear of a van-type vehicle, illustrating a portion of the back seat of the vehicle having mounted thereon the back panel organizer provided by the invention.
Figure 2:
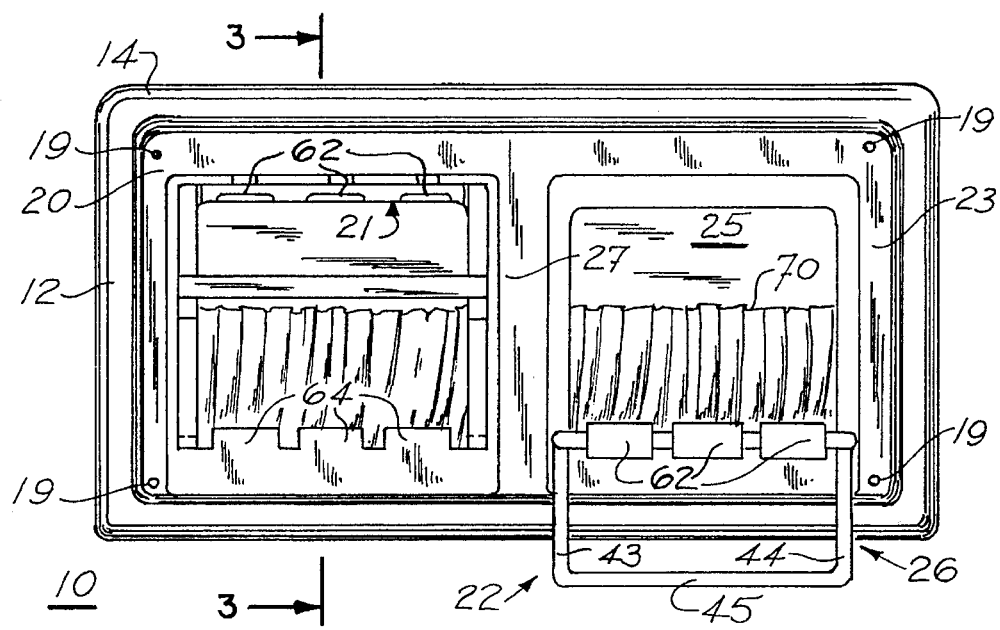
FIG. 2 is a front elevation view of a rear seat with the back panel organizer provided by the invention mounted thereon and shown with one support rack in its use condition and the other support rack shown in its stored position.

Referring to FIGS. 1 and 2 of the drawings, the back panel organizer 10 provided by the present invention is adapted to be mounted on the back 12 of a rear seat 14 of a motor vehicle, particularly, a van-type vehicle, having a storage space 15 located rearward of the rearmost seat of the vehicle and forward of the rear door of the vehicle that provides access to the storage space. The back panel organizer 10 includes a panel 20 and two support racks 21 and 22, which are located at opposite sides of the panel 20. The support racks are individually operable so that they can be deployed one at a time, as illustrated in FIG. 2, or both support racks can be deployed at the same time, depending upon need.

Digressing, the seat backs of many van-type vehicles include a factory installed decorative back panel that is removably mounted in a recess formed in the seat back and secured thereto by screws which pass through screw holes provided at the four corners of the panel. In accordance with a feature of the invention, the back panel organizer 10 is adapted to be mounted in the recess 17 in the back 12 of the seat, as shown in FIG. 3, in place of the factory installed seat back panel (not shown). The back panel organizer 10 is installed as a unit by removing the conventional back panel and substituting the back panel organizer 10 in its place and securing the panel 20 to the seat back by the hardware 19 that is used to secure the conventional back panel in place. The panel 20 has screw holes at its corners for receiving the screws 19 which secure the panel to the seat back in the tapped holes for the conventional decorative panel. The back panel organizer 10 is made of a durable plastic or steel, but is preferably made of a durable plastic with color codes to match OEM specifications for the vehicle in which it is installed. Alternatively, the features of the panel can be molded integrally into the seat back and the support racks can be attached directly to the back of the seat.

The panel 20 includes a raised peripheral edge 23 and a recessed center portion 25 that is divided into left-hand and right-hand sections by a vertical rib 27, each of the sections being adapted to receive and store one of the support racks 21 and 22 in a manner that the back panel organizer assembly when in its stored condition is substantially flush with the rear surface of the back of the seat back on which it is installed.

Referring additionally to FIGS. 4 and 5, the support racks 21 and 22 are identical to one another, and accordingly, like elements of the support racks have been given the same reference numerals. Each support rack includes frame 24 and a support structure 26. The frame is a one piece, U-shaped tubular member having parallel side arms 31 and 32 extending from a base portion 33 of the tubular member. The side arms are pivotally connected to the panel 20 by a pivot mechanism 28. The pivot mechanism includes a pivot tube 34 which extends through apertures 35 in the flattened ends 36 of the side arms 31 and 32 and through apertures 38 in one or more locator members 39 which are molded integrally with the panel 20 and adapted to support the pivot tube at both ends thereof. A suitable fastener 40 is adapted to be mounted on the end of the pivot tube 34 to hold the frame 24 in place on the panel 20.

The pivot mechanism 28 mounts the frame 24 on the panel 20 in cantilever form to permit the frame 24 to pivot about the ends 36 of its side arms 31 and 32 relative to the panel 20 and the seat back between stored and use positions. In the stored position, the frame 24 is oriented generally vertically and is located within the recessed portion 25 of the panel 20. When the frame is pivoted downward about its ends to the use position, such as for support rack 22 shown in FIG. 1, the frame 24 is oriented generally horizontally and extends rearward from the panel 20 into the storage space 15. The frame cooperates with the lower edge 29 of the panel 20 to define a horizontally extending closed loop structure or support hoop that extends into the storage space at a height "h" above the floor or support surface 16 of the storage space 15. The support hoop is adapted to receive and encircle at least one item for supporting the one item in an upright position while the vehicle is being driven.

Each of the side arms 31 and 32 of the frame is formed by a pair of telescoping tubes 41 and 42 which permit adjustment in the fore-and-aft depth of the frame, as shown in FIG. 4, to match the support rack to the depth of the storage space and to accommodate travel adjustment of the seat on which the back panel organizer is mounted. Moreover, the ability to adjust the length of the side arms facilitates the storage of the support rack within the recessed area of the panel 20.

The support structure 26 includes a U-shaped tubular member including a pair of legs 43 and 44 which are interconnected by a foot portion 45. The support structure is adapted to support the frame at its forward end of the cantilevered mounted frame on the floor of the storage space when the frame is deployed to its use position. The U-shaped tubular member is articulated to the frame at or adjacent to its base portion 33 to permit the support structure to be pivoted between stored and use positions. The frame includes a flanges 46 on the lower surfaces 47 of its side arms to which the upper ends 48 of the legs are connected by a pivot pin 49. In the stored position, the support structure is folded onto the bottom surface of the side arms as shown in FIG. 5. When deployed in the use position, as shown in FIG. 1, the support structure 26 is pivoted on the frame to be folded down from it stored position to its use position in which it extends generally vertically and is perpendicular to the frame with its foot portion resting on the floor 16 of the vehicle. When deployed to its use position, the support structure supports the free end of the cantilever mounted frame at the height "h" above the floor of the storage space that is proper for maintaining the shopping bags in an upright position. The leg or foot structure is securely fastened in a channel member 50 which is mounted on the floor of the storage space as shown in FIGS. 1 and 4, and which permits the support rack to be locked in place in its use position. The channel member 50, which is a generally U-shaped track, is adapted for receiving the tubular cross member of the support structure and locking it in place on the floor 16. The channel member 50 can include a mechanism (not shown) that is operable between a gripping condition in which it grips the foot of the support rack to hold the foot to the channel and a release condition in which the foot is released, allowing the foot to be withdrawn from the channel and folded to its stored position. In a further arrangment illustrated in FIG. 12, the foot 45 of the support includes a spring loaded mechanism in the form of an inverted U-shaped locking member 53 that extends through spaced apart apertures 54 in the foot and has ends 55 adapted to be received in apertures 56 in the channel member 50. The locking member can be maintained in engaging relation with the track either by a friction fit of by a latching mechanism (not shown) that is releasable by pulling up on the handle formed by the cross member of the locking member. The cross member has a cover 57 of vinyl, or other suitable material to provide a more comfortable grip for the user and to be more attractive from an aesthetic viewpoint.

Alternatively, in accordance with the embodiment that is illustrated in FIGS. 8–11, the upper ends 48 of the legs include guides 51 which are adapted to slide in tracks 59 formed in the lower surfaces 47 of the side arms. The upper ends of the legs slide fore-and-aft along the length of the side arms from a stored position FIG. 8, in which the legs lie along the bottom surface of the side arms of the frame, through an intermediate position shown in FIG. 9, to the use or fully extended position, shown in FIG. 10, in which the legs extend generally vertical and are oriented perpendicular to the frame.

Referring to FIGS. 1, 6 and 7, the back panel organizer 10 is particularly suitable for maintaining one or more shopping bags 60 in an upright position when the vehicle is being driven home after a shopping trip. The shopping bags can be self-supporting type, which are typically made of paper, or plastic shopping bags, which are generally not self-supporting, that are used by retail stores, particularly by grocery stores for packaging grocery purchases. To this end, the back panel organizer 10 includes a convenience attachment for such shopping bags. When the support rack is deployed and locked in place, three small tab-like handle holders 62 are exposed in alignment with three mating tab-like handle holders 64 on the panel 20. The handle holders 62 are formed on and spaced apart along the base portion 33 at the front of the frame and are aligned front to back with the three mating handle holders 64 spaced along the lower portion 29 of the frame 20. The handle holders include a small vertically extending plate-like portion 65 that is shaped so that the "loop" type handles 66 and 67 of the plastic bag 60 can be wrapped around the handle holders so that the shopping bag is supported in an upright position. The plate-like portion 65 is molded integrally with the base portion of the tubular frame 24. Alternatively, handle holders 68 can be molded into a section of the base portion 33 of the frame as shown in FIG. 7.

Referring to FIG. 6, one handle 66 of the plastic bag is wrapped around one of the handle holders 62 on the frame, and the other handle 67 of the bag is wrapped around the mating handle holder 64 on the panel. The frame 24 supports the bag 60 by its handles 66 and 67 in an upright position and prevents the bag 60 from spilling its contents into the storage space 15.

Referring to FIGS. 1 and 2, in accordance with a further feature of the invention, a pair expandable gather bags 70 are provided on the panel 20 for storing smaller items. The gather bags are attached to the panel in its recessed area 25 in a suitable manner.

The back panel organizer 10 includes a retaining mechanism for retaining the support rack in the stored position. In accordance with a preferred embodiment, the retaining mechanism for retaining the support rack in its stored position includes one or more strips or loops 72 of a resilient material, such as rubber or plastic, which are secured to the panel 20 and which are wrapped around one of the handle holders 62 on the frame when the support rack is in its stored position as shown in FIG. 5 for support rack 22, for example. Alternatively, the panel may include straps for securing the frame in its stored position or other securing means, such as hook and loop material associated with the panel and the frame.

Although the back panel organizer 10 is particularly suited for supporting plastic shopping bags of the type that are not self-supporting, the frame 24 can be used to support other types of containers, such as paper bags, such bags being located within the confines of the frame with the bags engaging the side and the cross arms 33 of the frame, for supporting the bag at its upper portion. Moreover, packages, boxes, coolers, or other items can be placed or packed within the confines of the frame, such items being maintained in position in engagement with the frame, which prevents the items from shifting within the storage space as the vehicle is driven.

Referring to FIGS. 1 and 2, to deploy the back panel organizer 10, the band 72 is removed from the handle holder 62 to release the support rack. Then, the frame 24 is pivoted down, and the side tubes 31 and 32 are extended to match the depth of the storage space. As the rack is being pivoted down, the support structure 26 is pivoted out, away from the lower surface of the side arms. When the frame has been pivoted to its horizontal use position, the foot 45 is aligned with the mounting track 50 and then snapped into the track to lock the support rack in its use position and the back panel organizer is ready for use.

Packaged items then can be positioned within the closed loop defined by the storage rack and the handles of a plastic shopping bags can be wrapped around the handle holders in the manner that has been described previously with reference to FIGS. 1 and 6, for example, so that the shopping bags are maintained in an upright position for the trip home from the store. As has been indicated, the tubular frame can also hold larger items from three feet wide to as much as five feet wide. Loose items and items in small bags can be placed in the gather bags 70 on the panel 20.

The reverse procedure is used to store the support racks after the stored items have been unloaded from the vehicle. First, the foot 45 of the support structure is released from the track 50 and the support structure is folded onto the lower surface of the frame side arms 31 and 32. While the frame is being pivoted upwardly about its ends towards the stored position, the tubes of the sidearms are telescoped into the tubes. When the support rack has been returned to its stored position in the recess in the panel 20, the bands are wrapped around the handle holders to hold the support rack in the stored position.

Thus, it has been shown that the present invention provides a back panel organizer for van-type motor vehicles having a storage space at the rear of the vehicle. The back panel organizer includes a panel and one or more support racks mounted on the panel. The panel is adapted to be mounted on the back of the rear seat. Each of the support racks includes a U-shaped frame that is mounted to the panel for pivoting movement relative to the seat back between a stored position in which the frame is oriented generally vertically and a use position in which the frame is oriented generally horizontally in cantilever form and extends into the storage space. The frame includes handle holders about which are wrapped the handles of plastic shopping bags so that the frame supports the plastic bags in an upright position in the storage space of the vehicle and prevents the bags from spilling their contents when the vehicle is driven. Each support rack includes a foldable leg support for supporting the front end of the cantilever mounted frame when it is deployed in its use position. While the invention has been described with reference to preferred embodiments, various modifications can be made without departing from the spirit and scope of the invention as defined in the appended claims.

I claim:

1. A back panel organizer for a motor vehicle having a rear seat and a storage space that is located rearward of the rear seat and forward of a rear door of the vehicle that provides access to said storage space, said rear seat including a seat back portion having a rear surface facing said storage space, said back panel organizer comprising:

a frame including a base portion and first and second parallel side arms extending from said base portion and terminating in ends;

mounting means for mounting said frame on said rear surface of said seat back for pivoting movement of said frame about the ends of its side arms relative to said seat back between a stored position in which said frame is oriented generally vertically and extends generally co-planar with said rear surface of said seat back and a use position in which said frame is oriented generally horizontally and cooperates with said mounting means to define a horizontally extending closed loop structure that extends in cantilever form into said storage space at a height above a support surface of said storage space and is adapted to receive and encircle at least one item, for supporting said one item in an upright position and limiting horizontal movement of said one item within said storage space while the vehicle is being driven;

and support means for supporting said frame near said base portion when said frame is in said use position.

2. The back panel organizer according to claim 1, wherein said support means is mounted on said frame and is carried by said frame as said frame is moved between said stored and use positions, said support means being adapted to be pivoted relative to said frame between a stored position in which said support means is oriented generally parallel to said frame and a use position in which said support means is oriented generally perpendicular to said frame.

3. The back panel organizer according to claim 2, wherein said support means includes first and second leg portions having respective first and second ends, and means for connecting said first and second ends to said frame near said base portion to permit said leg portions to be pivoted relative to said frame between said stored and use positions for said support means.

4. The back panel organizer according to claim 2, wherein said frame defines first and second longitudinally extending guide tracks in lower surfaces of said first and second side arms, and wherein said support means includes first and second leg portions having respective first and second ends which are mounted in said first and second guide tracks for sliding movement along said lower surfaces of said side arms and for providing pivoting movement of said leg portions between said stored and use positions for said support means.

5. The back panel organizer according to claim 3, including securing means adapted to be mounted in said storage space on the support surface thereof for receiving and securing said leg portions of said support structure when said frame and said support structure are deployed to their use position.

6. The back panel organizer according to claim 2, wherein said mounting means includes a panel that is adapted to be mounted on said rear surface of said seat back portion of said rear seat, said panel having a recessed portion in its outer surface for receiving said frame when said frame is in its stored position.

7. The back panel organizer according to claim 6, wherein said seat back includes a recessed portion in said rear surface thereof, said panel adapted to be mounted on said seat back in said recessed portion.

8. The back panel organizer according to claim 6, wherein said panel includes a gather bag for storing small items.

9. The back panel organizer according to claim 6, wherein said frame comprises a U-shaped tubular member and said support means comprises a further U-shaped tubular member which is pivotally mounted to said frame, said panel having a recessed portion and said frame and said support means being located in said recessed portion of said panel when said frame and said support means are in their respective stored positions.

10. The back panel organizer according to claim 1, wherein each of said side arms of said frame includes first and second tubular members which extend in telescoping relationship for permitting adjustment in the fore-and-aft depth of the frame when deployed to said use position.

11. The back panel organizer according to claim 6, wherein said ends of said side arms have flattened portions with an aperture therethrough, and wherein said pivot means includes at least one flange on said panel and having an aperture therethrough and a pivot rod extending through said aperture in said flange and through said apertures in said flattened end portions of said side arms.

12. The back panel organizer according to claim 6, wherein said back panel includes retaining means cooperating with said frame for retaining said frame in said stored position.

13. A back panel organizer for a van-type motor vehicle having a rear seat and storage space that is located rearward of the rear seat and forward of a rear door of the vehicle that provides access to said storage space, said rear seat including a seat back portion having a rear surface facing said storage space, said back panel organizer comprising:

a panel adapted to be mounted on said rear surface of said seat back portion facing said storage space, said panel having a recessed portion facing said storage space;

a U-shaped frame including a base portion and first and second parallel side arms extending from said base portion and terminating in ends;

mounting means for mounting the side arms of said frame to said panel for pivoting movement of said frame about the ends of said side arms between a stored position in which said frame is oriented generally vertically and located in said recessed portion of said panel and a use position in which said frame is oriented generally horizontally and cooperates with said panel to define a horizontally extending closed loop structure that extends in cantilever form into said storage space at a height above a support surface of said storage space and is adapted to receive and encircle at least one item, for supporting said one item in an upright position and limiting horizontal movement of said one item within said storage space while the vehicle is being driven;

and a support structure articulated to said frame at said base portion, said support structure being adapted to be pivoted between a stored position in which said support structure extends generally parallel to said frame and a use position in which said support structure is oriented generally perpendicular to said frame for supporting said base portion of said frame when said frame is in said use position.

14. The back panel organizer according to claim 13, wherein said support structure includes first and second leg portions having respective first and second ends, and means for connecting said first and second ends to said frame near said base portion to permit said leg portions to be pivoted relative to said frame between said stored and use positions for said support means.

15. The back panel organizer according to claim 13, wherein said panel includes at least a first handle holder and said base portion of said frame includes at least a second handle holder, said first handle holder being adapted to have a first handle of a shopping bag wrapped therearound and second handle holder being adapted to have a second handle of said shopping bag wrapped therearound when said frame is in said use position, whereby said frame supports said shopping bag in an upright position within said frame between said panel and said base portion of said frame.

16. The back panel organizer according to claim 15, wherein a plurality of said handle holders are molded into said panel and a corresponding plurality of handle holders are molded into said base portion of said frame.

17. The back panel organizer according to claim 15, wherein said shopping bag is non self-supporting and is made of a thin, plastic material.

18. The back panel organizer according to claim 16, including retaining means for maintaining said frame in the stored position.

19. The back panel organizer according to claim 18, wherein said retaining means includes a strip of a resilient material secured to said panel and adapted to be wrapped around said handle holder on said base portion of said frame when said frame is in said stored position.

20. A back panel organizer for a van-type motor vehicle having a rear seat and storage space which is located rearward of the rear seat and forward of a rear door of the vehicle that provides access to said storage space, said rear seat including a seat back having a rear surface facing said storage space, said back panel organizer comprising:

a panel adapted to be mounted on said rear surface of said seat back, and said panel having a recessed portion facing said storage space;

a U-shaped frame including a base portion and first and second parallel side arms extending from said base portion and terminating in ends;

mounting means for mounting said side arms of said frame to said panel for pivoting movement of said frame about said ends of said side arms between a stored position in which said frame is oriented generally vertically and located in said recessed portion of said panel and a use position in which said frame is oriented generally horizontally in cantilever form and extends into said storage space;

and a support structure articulated to said frame at said base portion, said support structure being adapted to be pivoted between a stored position in which said support structure extends generally parallel to said frame and a use position in which said support structure is oriented generally perpendicular to said frame for supporting said base portion of said frame when said frame is in said use position;

said panel including at least a first handle holder and said base portion of said frame including at least a second handle holder, said first handle holder being adapted to have a first handle of a shopping bag wrapped therearound and said second handle holder being adapted to have a second handle of the shopping bag wrapped therearound when said frame is in said use position, whereby said frame supports the shopping bag in an upright position within said frame between said panel and said base portion of said frame.

* * * * *